United States Patent [19]
Hwang

[11] Patent Number: 6,115,591
[45] Date of Patent: Sep. 5, 2000

[54] SPACE DIVERSITY RECEIVER FOR USE IN RADIO TRANSMISSION SYSTEM AND METHOD THEREOF

[75] Inventor: In-Kyou Hwang, Seongnam, Rep. of Korea

[73] Assignee: SamSung Electronics Co., Ltd., Suwon, Rep. of Korea

[21] Appl. No.: 08/964,329

[22] Filed: Nov. 4, 1997

[30] Foreign Application Priority Data

Nov. 4, 1996 [KR] Rep. of Korea ........................ 96-51901

[51] Int. Cl.[7] ........................................ H04B 1/16
[52] U.S. Cl. ........................ 455/277.2; 455/135; 455/273; 455/278.1
[58] Field of Search .................... 455/277.2, 135, 455/138, 139, 273, 278.1, 272, 137

[56] References Cited

U.S. PATENT DOCUMENTS

| | | | |
|---|---|---|---|
| 4,373,210 | 2/1983 | Karabinis et al. | 455/273 |
| 4,386,435 | 5/1983 | Ulmer et al. | 455/139 |
| 4,578,819 | 3/1986 | Shimizu | 455/135 |
| 5,202,903 | 4/1993 | Okanoue | 375/100 |
| 5,321,850 | 6/1994 | Backstrom et al. | 455/139 |
| 5,530,925 | 6/1996 | Garner . | |
| 5,553,102 | 9/1996 | Jasper et al. | 375/347 |
| 5,809,090 | 9/1998 | Buternowsky et al. | 375/347 |

*Primary Examiner*—Daniel S. Hunter
*Assistant Examiner*—Thuan T. Nguyen
*Attorney, Agent, or Firm*—Robert E. Bushnell, Esq.

[57] ABSTRACT

A space diversity receiver for use in a radio transmission system reduces a fading effect of a received signal and generates a constant output regardless of a variation of a signal-to-noise ratio of the received signal. The space diversity receiver compares a signal-to-noise ratio of a signal received from a first antenna and a signal-to-noise ratio of a signal received from a second antenna, so as to amplify the received signal having a higher signal-to-noise ratio and attenuate the received signal having a lower signal-to-noise ratio. The amplified signal is combined with the attenuated signal.

11 Claims, 2 Drawing Sheets

SPACE DIVERSITY RECEIVER FOR USE IN RADIO TRANSMISSION SYSTEM AND METHOD THEREOF

CLAIM OF PRIORITY

This application makes reference to, incorporates the same herein, and claims all benefits accruing under 35 U.S.C §119 from an application entitled *Space Diversity Receiver For Use In Radio Transmission System And Method Thereof* earlier filed in the Korean Industrial Property Office on Nov. 4, 1996, and there duly assigned Ser. No. 96-51901 by that Office.

BACKGROUND OF THE INVENTION

1. Field of the Invention

The present invention relates to a space diversity receiver for use in a radio transmission system, and more particularly to a space diversity receiver with an improved signal-to-noise ratio feature and a method thereof.

2. Description of the Related Art

In general, a space diversity receiver for use in a radio transmission system combines signals received from two or more antennas and provides a receiver with the combined signal to minimize fading and distortion due to environmental conditions. To get the combined signal from two antennas it is known to use the signal strength of the two signals, the amplitude to frequency signal dispersion, or the phase difference between the two signals to decide whether to combine the received signals.

It is known that the typical space diversity receiver signal combiner is positioned at a front stage of an intermediate frequency amplifier in the radio transmission system, and the intermediate frequency amplifier may compensate the signal generated from the signal combiner. However, when the signal combiner is placed in a rear stage of the intermediate frequency amplifier, like the system to which the present invention is applicable, the signal output from the signal combiner may not be compensated.

U.S. Pat. No. 5,530,925 to Charles L. Garner entitled *Intermediate Frequency Combiner For A Radio Communication System* contemplates a system in which the decision on whether or not to combine two intermediate frequency signals, received from diverse antennas, is based on signal strength of the two signals and the amplitude to frequency signal dispersion. Additionally, a phase detector/corrector is provided to compensate for the phase difference between the two signals prior to squelching one of the signals in response to the received signal strength and signal dispersion.

SUMMARY OF THE INVENTION

It is therefore an object of the present invention to provide a space diversity receiver for reducing a fading effect of a received signal and a method thereof.

It is another object of the present invention to provide a space diversity receiver for generating a constant output regardless of a variation of a signal-to-noise ratio of a received signal According to an aspect of the present invention, a space diversity receiver includes first and second antennas for receiving the radio frequency signal. A phase detector detects a phase difference between the signal received from the first antenna and the signal received from the second antenna, to generate a phase transition control signal. A phase changing apparatus changes a phase of the signal received from the first antenna in response to the phase transition control signal. A signal-to-noise comparator compares a signal-to-noise ratio of the signal received from the first antenna with a signal-to-noise ratio of the signal received from the second antenna, to generate first and second comparison signals. A first signal attenuator and amplifier attenuates and amplifies a signal output from the phase changing apparatus in response to the first comparison signal. A second signal attenuator and amplifier attenuates and amplifies the signal received from the second antenna in response to the second comparison signal. A signal combiner combines a signal output from the first signal attenuator and amplifier with a signal output from the second signal attenuator and amplifier. The first and second signal attenuators and amplifiers amplify the received signal having a higher signal-to-noise ratio and attenuate the received signal having a lower signal-to-noise ratio, in response to the first and second comparison signals generated from the signal-to-noise comparator.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the attached drawings. Further, it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 1:
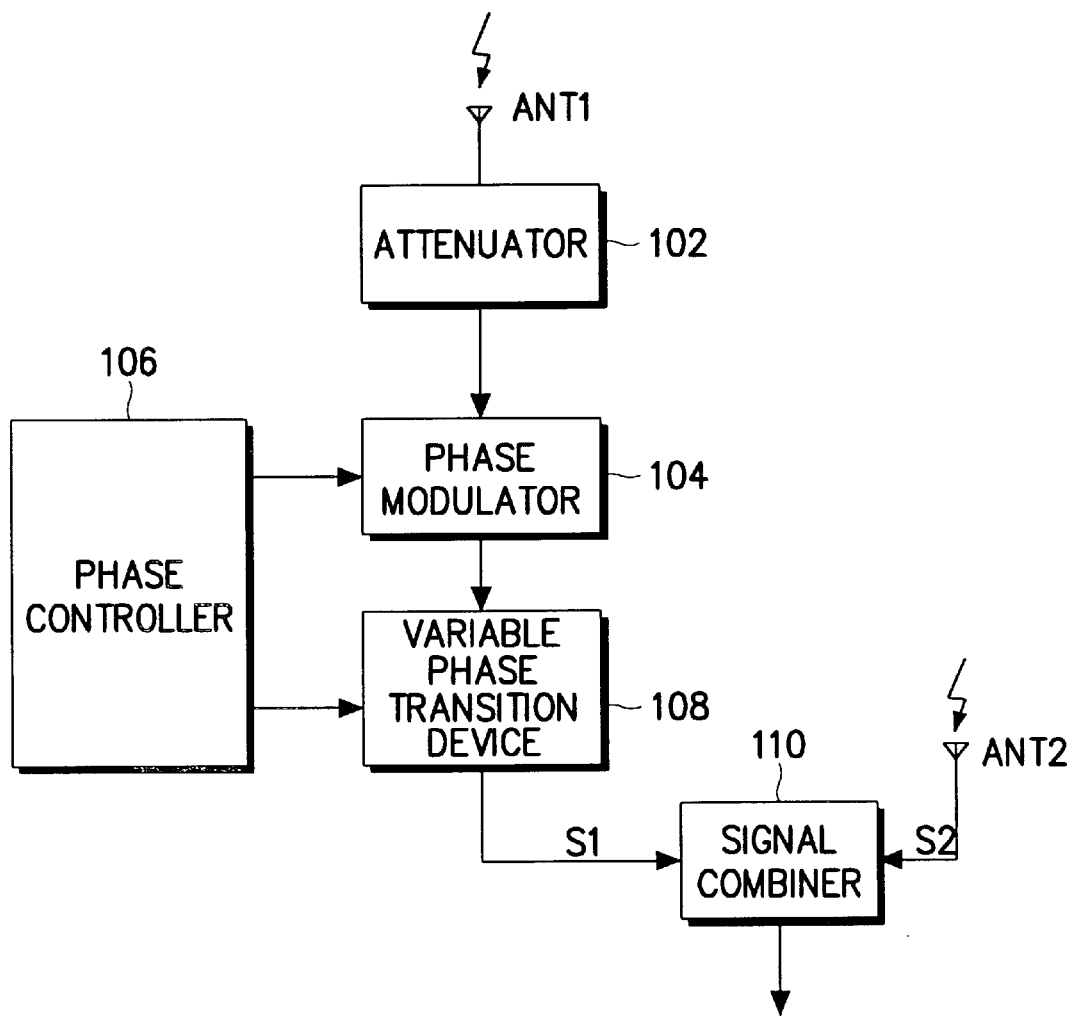
FIG. 1 is a generalized block diagram of an exemplary space diversity receiver for use in a radio transmission system.

Referring to FIG. 1, an exemplary space diversity receiver for use in a radio transmission system includes an antenna Ant1, an antenna Ant2, an attenuator 102, a phase modulator 104, a phase controller 106, a variable phase changing apparatus 108, and a signal combiner 110. Antenna Ant1 receives a transmitted signal and attenuator 102 attenuates the signal received from antenna Ant1. Phase modulator 104 phase-modulates the signal output from attenuator 102 under the control of phase controller 106. Variable phase changing apparatus 108 changes a phase of the signal output from phase modulator 104 under the control of phase controller 106. Phase controller 106 controls phase modulator 104 and variable phase changing apparatus 108. Signal combiner 110 combines the output signal S1 from variable phase changing apparatus 108 with a signal S2 received from second antenna Ant2.

Figure 2:
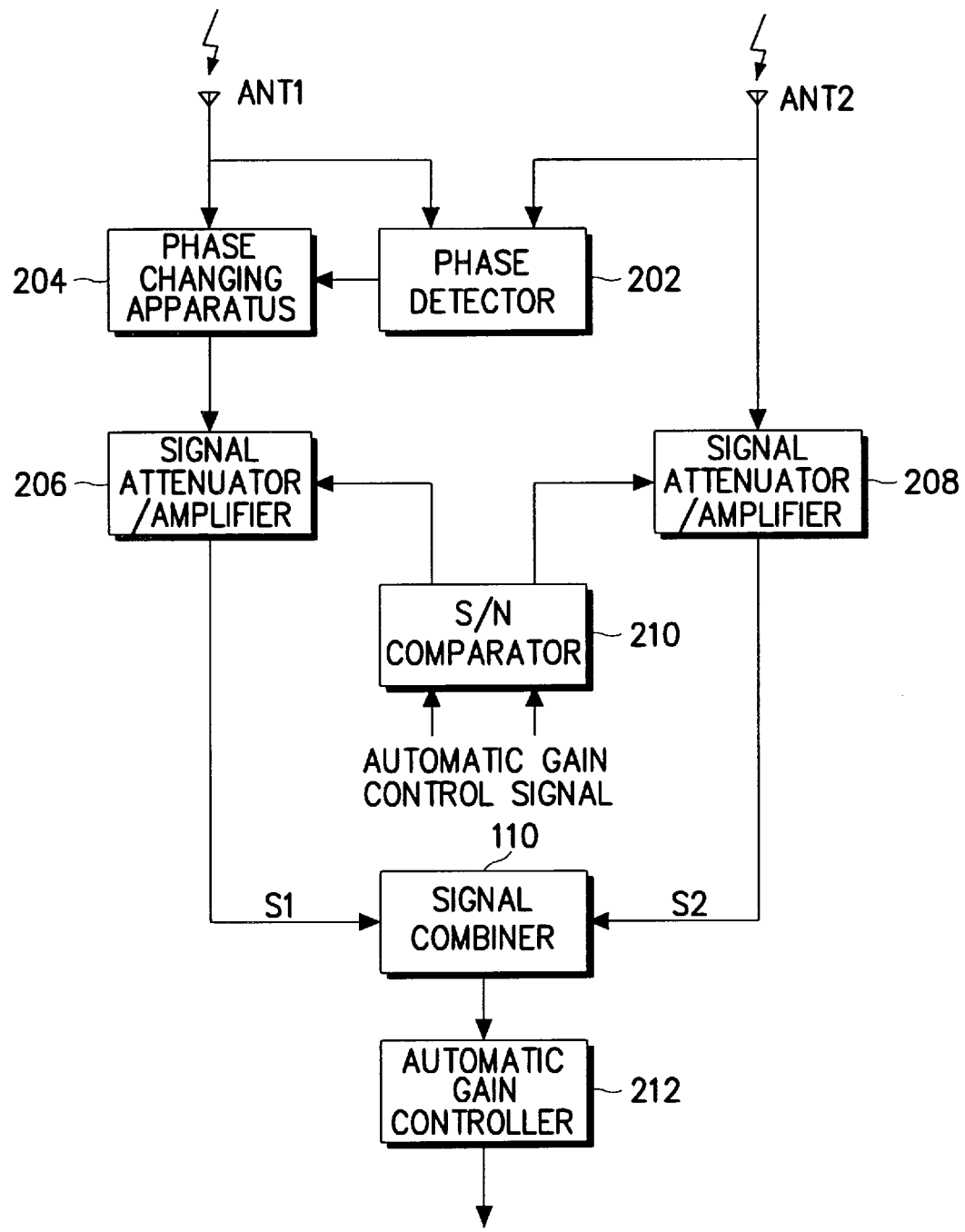
FIG. 2 is a block diagram of a space diversity receiver for use in a radio transmission system according to the principles of the present invention.

Referring to FIG. 2, a space diversity receiver for use in a radio transmission system according to the present invention includes antenna Ant1, antenna Ant2, a phase detector 202, a phase changing apparatus 204, a first signal attenuator and amplifier 206, a second signal attenuator and amplifier 208, a signal-to-noise (S/N) comparator 210, a signal combiner 110, and an automatic gain controller 212. Referring again to FIG. 1, if the signal-to-noise ratio of signal S1 received from antenna Ant1 is compared with the signal-to-noise ratio of signal S2 received from antenna Ant2, and if the result of the comparison indicated that a difference between the signal-to-noise ratios of signals S1 and S2 exceeded 13 dB, attenuator 102 should be inserted into the signal path of the antenna which has the lower signal-to-noise ratio to improve the signal-to-noise ratio of the combined signal. However, as shown in FIG. 1 attenuator 102 is positioned only in the signal path of antenna Ant1.

As illustrated in FIG. 2, however, antenna Ant1 receives a radio frequency signal and transfers the received signal to phase detector 202 and phase changing apparatus 204. Similarly, antenna Ant2 receives the radio frequency signal and transfers the received signal to phase detector 202 and second 8 signal attenuator and amplifier 208. Phase detector 202 multiplies the signal received from antenna Ant1 by the signal received from antenna Ant2, to detect a phase difference between two signals. Further, phase detector 202 generates a phase transition control signal based on the phase difference detected, and provides phase changing apparatus 204 with the phase transition control signal. Phase changing apparatus 204 changes a phase of the signal received from antenna Ant1 in response to the phase transition control signal generated from phase detector 202. That is, phase changing apparatus 204 makes the signal received from antenna Ant1 have the same phase as that of the signal received from antenna Ant2. Though not illustrated in FIG. 2, an intermediate frequency amplifier generates automatic gain control voltages according to intensities of the signals received from antennas Ant1 and Ant2. In other words, the intermediate frequency amplifier provides the automatic gain control voltages corresponding respectively to the intensities of the signals received from antennas Ant1 and Ant2. Signal-to-noise comparator 210 compares the signal-to-noise ratio of the signal received from antenna Ant1 with the signal-to-noise ratio of the signal received from antenna Ant2 based on the automatic gain control signals from the intermediate frequency amplifier, so as to generate first and second comparison signals corresponding to the signal-to-noise ratio differences. Signal attenuator as and amplifier 206 and signal attenuator and amplifier 208 attenuate or amplify the signals applied thereto in response to the first and second comparison signals from signal-to-noise comparator 210. Specifically, signal attenuator and amplifier 206 and signal attenuator and amplifier 208 amplify the signal having the higher signal-to-noise ratio, and attenuate the signal having the lower signal-to-noise ratio. Signal combiner 110 combines a first signal S1 generated from signal attenuator and amplifier 206 with a second signal S2 generated from signal attenuator and amplifier 208. Automatic gain controller 212 controls a gain of the signal output from signal combiner 110 to generate a constant output signal.

The space diversity receiver of the invention may stabilize a variation of the output signal intensity within ±1 dB. Therefore, it is possible to minimize a variation of a signal transferred to a modulator, thus reducing signal errors.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A space diversity receiver for use in a radio transmission system, comprising:

first and second antennas for receiving a radio frequency signal;

a phase detector for detecting a phase difference between the signal received from said first antenna and the signal received from said second antenna, to generate a phase transition control signal;

a phase changing apparatus for changing a phase of the signal received from said first antenna in response to said phase transition control signal generated from said phase detector;

a signal-to-noise comparator for comparing a signal-to-noise ratio of the signal received from said first antenna with a signal-to-noise ratio of the signal received from said second antenna, to respectively generate first and second comparison signals;

a first signal attenuator and amplifier for attenuating or amplifying a signal output from said phase changing apparatus in response to said first comparison signal;

a second signal attenuator and amplifier for attenuating or amplifying the signal received from said second antenna in response to said second comparison signal; and a signal combiner for outputting a composite signal by combining a signal output from said first signal attenuator and amplifier with a signal output from said second signal attenuator and amplifier.

2. The space diversity receiver as set forth in claim 1, wherein one of said first and second signal attenuators and amplifiers amplifies the signal having a higher signal-to-noise ratio and the other of said first and second signal attenuators and amplifiers attenuates the signal having a lower signal-to-noise ratio, in response to said first and second comparison signals generated from said signal-to-noise comparator.

3. The space diversity receiver as set forth in claim 1, further comprising an automatic gain controller for controlling a gain of said composite signal output from said signal combiner to generate a constant output signal.

4. A space diversity receiving method for use in a radio transmission system, comprising the steps of:

detecting a signal-to-noise ratio of a signal received from a first antenna and a signal-to-noise ratio of a signal received from a second antenna;

amplifying the received signal having a higher signal-to-noise ratio and attenuating the received signal having a lower signal-to-noise ratio; and combining the amplified signal with the attenuated signal.

5. The space diversity receiving method as set forth in claim 4, further comprising the steps of:

detecting a phase difference between said signal received from said first antenna and said signal received from said second antenna;

changing a phase of said signal received from first antenna according to the detected phase difference; and performing said steps of amplifying the received signal having said higher signal-to-noise ratio and attenuating the received signal having said lower signal-to-noise ratio.

6. The space diversity receiving method as set forth in claim 4, further comprising a step of controlling a gain of a composite signal resulting from said step of combining the amplified signal with the attenuated signal.

7. A space diversity receiving method for use in a radio transmission system, comprising the steps of:
- detecting a phase difference between a first signal received from a first antenna and a second signal received from a second antenna;
- generating a third signal by changing a phase of said first signal according to the detected phase difference;
- detecting a signal-to-noise ratio of said first signal and a signal-to-noise ratio of said second signal;
- supplying said third signal to a first attenuator and amplifier, said third signal being amplified when said first signal has a signal-to-noise ratio higher than said second signal or attenuated when said first signal has a signal-to-noise ratio lower than said second signal;
- supplying said second signal to a second attenuator and amplifier, said second signal being amplified when said second signal has a signal-to-noise ratio higher than said first signal or attenuated when said second signal has a signal-to-noise ratio lower than said first signal; and
- combining the amplified signal with the attenuated signal to output a combined signal.

8. The space diversity receiving method as set forth in claim 7, further comprising a step of controlling a gain of said combined signal.

9. A space diversity receiving method for use in a radio transmission system, comprising the steps of:
- detecting a signal-to-noise ratio of a signal received from a first antenna and a signal-to-noise ratio of a signal received from a second antenna;
- detecting a phase difference between said signal received from said first antenna and said signal received from said second antenna;
- changing a phase of said signal received from first antenna according to the detected phase difference;
- amplifying the received signal having a higher signal-to-noise ratio and attenuating the received signal having a lower signal-to-noise ratio, after changing the phase of said signal received from first antenna; and
- combining the amplified signal with the attenuated signal.

10. A space diversity receiving method for use in a radio transmission system, comprising the steps of:
- detecting a signal-to-noise ratio of a signal received from a first antenna and a signal-to-noise ratio of a signal received from a second antenna;
- amplifying the received signal having a higher signal-to-noise ratio;
- attenuating the received signal having a lower signal-to-noise ratio; and
- combining the amplified signal with the attenuated signal to form a composite signal; and
- controlling a gain of said composite signal.

11. The space diversity receiving method as set forth in claim 10, further comprising the steps of:
- detecting a phase difference between said signal received from said first antenna and said signal received from said second antenna;
- changing a phase of said signal received from first antenna according to the detected phase difference; and
- performing said steps of amplifying the received signal having said higher signal-to-noise ratio and attenuating the received signal having said lower signal-to-noise ratio.

* * * * *